(12) United States Patent
Little et al.

(10) Patent No.: US 12,249,251 B2
(45) Date of Patent: *Mar. 11, 2025

(54) VIRTUAL MULTI-PROPERTY TRAINING ENVIRONMENT

(71) Applicant: State Farm Mutual Automobile Insurance Company, Bloomington, IL (US)

(72) Inventors: Rebecca A. Little, Mesa, AZ (US); Bryan R. Nussbaum, Bloomington, IL (US); Deanna L. Stockweather, Normal, IL (US); Nathan C. Summers, Mesa, AZ (US); Vicki King, Bloomington, IL (US); Teresa Ho, Mesa, AZ (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/508,662

(22) Filed: Nov. 14, 2023

(65) Prior Publication Data

US 2024/0087467 A1 Mar. 14, 2024

Related U.S. Application Data

(63) Continuation of application No. 16/399,005, filed on Apr. 30, 2019, now Pat. No. 11,847,937.

(51) Int. Cl.
*G06F 17/00* (2019.01)
*G06Q 40/08* (2012.01)
(Continued)

(52) U.S. Cl.
CPC ............. *G09B 5/12* (2013.01); *G06Q 40/08* (2013.01); *G06T 15/00* (2013.01); *G06T 19/003* (2013.01)

(58) Field of Classification Search
CPC ....... G06Q 40/08; G06T 15/00; G06T 19/003; G06T 19/00
(Continued)

(56) References Cited

U.S. PATENT DOCUMENTS 6,836,270 B2 12/2004 Du
7,949,295 B2 5/2011 Kumar et al.
(Continued)

FOREIGN PATENT DOCUMENTS

EP 0930755 A1 7/1999
JP 4189996 12/2008
(Continued)

OTHER PUBLICATIONS

PRNewswire, Farmers Insurance Pioneers Innovative Virtual Reality Training Program for Claims Representatives, 2017 (Year: 2017).*

(Continued)

*Primary Examiner* — Adam M Queler
*Assistant Examiner* — Matthew J Ludwig
(74) *Attorney, Agent, or Firm* — Lee & Hayes, P.C.

(57) ABSTRACT

A virtual environment may be provided, the virtual environment including a procedurally generated virtual landscape. The virtual landscape may include various components, such as natural terrain elements, infrastructural elements, and residential/commercial properties, that are automatically generated based upon procedural rules so as to provide uniqueness of any one virtual landscape. A user may enter the virtual environment and, via various virtual tools, identify aspects of the generated virtual landscape that affect risk to one or more of the properties therein.

19 Claims, 6 Drawing Sheets

(51) Int. Cl.
  *G06T 15/00*  (2011.01)
  *G06T 19/00*  (2011.01)
  *G09B 5/12*   (2006.01)

(58) Field of Classification Search
  USPC .................................... 715/757; 705/4, 7.28
  See application file for complete search history.

(56) References Cited

U.S. PATENT DOCUMENTS

| | | |
|---|---|---|
| 8,294,557 B1 | 10/2012 | El Saddik et al. |
| 8,655,683 B2 | 2/2014 | Grundel et al. |
| 8,694,501 B1 | 4/2014 | Trandal et al. |
| 8,718,612 B2 | 5/2014 | Calman et al. |
| 8,761,811 B2 | 6/2014 | Alonzo |
| 9,824,397 B1 | 11/2017 | Patel |
| 10,262,375 B1 | 4/2019 | Howard |
| 10,521,865 B1 | 12/2019 | Spader |
| 10,521,962 B1 | 12/2019 | Nussbaum et al. |
| 10,579,749 B1 | 3/2020 | Davis et al. |
| 10,832,476 B1 | 11/2020 | Nussbaum |
| 10,977,735 B1 | 4/2021 | Cardona et al. |
| 11,024,099 B1 | 6/2021 | Little |
| 11,481,081 B2 | 10/2022 | Deng et al. |
| 11,556,995 B1 | 1/2023 | Little et al. |
| 11,704,731 B2 | 7/2023 | Summerson et al. |
| 2002/0196202 A1 | 12/2002 | Bastian et al. |
| 2012/0047082 A1 | 2/2012 | Bodrozic |
| 2012/0095783 A1 | 4/2012 | Buentello et al. |
| 2012/0210254 A1 | 8/2012 | Fukuchi et al. |
| 2013/0290033 A1 | 10/2013 | Reeser et al. |
| 2014/0162224 A1* | 6/2014 | Wallace .................. G09B 5/06 434/219 |
| 2014/0180725 A1 | 6/2014 | Ton-That et al. |
| 2014/0280269 A1 | 9/2014 | Schultz et al. |
| 2014/0280644 A1 | 9/2014 | Cronin |
| 2015/0020003 A1 | 1/2015 | Karam |
| 2015/0056582 A1* | 2/2015 | Selvaraj ................. G09B 5/02 434/219 |
| 2015/0206218 A1 | 7/2015 | Banerjee et al. |
| 2016/0077547 A1 | 3/2016 | Aimone et al. |
| 2016/0117646 A1 | 4/2016 | Lerick et al. |
| 2016/0148285 A1 | 5/2016 | Kalata |
| 2017/0032466 A1* | 2/2017 | Feldman ............... G06Q 50/16 |
| 2017/0053455 A1 | 2/2017 | Chen et al. |
| 2017/0076408 A1 | 3/2017 | D'Souza et al. |
| 2017/0108922 A1 | 4/2017 | Terahata |
| 2017/0124396 A1 | 5/2017 | Todeschini et al. |
| 2017/0161852 A1 | 6/2017 | Takenaka et al. |
| 2017/0206798 A1 | 7/2017 | Newman |
| 2018/0082414 A1 | 3/2018 | Rozenberg |
| 2018/0374276 A1* | 12/2018 | Powers ................. G06T 17/205 |
| 2019/0130648 A1 | 5/2019 | Duca et al. |
| 2021/0366206 A1 | 11/2021 | Little et al. |
| 2023/0105545 A1* | 4/2023 | Little ...................... G06T 19/20 345/419 |

FOREIGN PATENT DOCUMENTS

| | | |
|---|---|---|
| WO | WO2016040376 A1 | 3/2016 |
| WO | WO2016148753 A1 | 9/2016 |

OTHER PUBLICATIONS

"360 Degree Virtual Reality Inspector Training", retrieved at least as early as Aug. 28, 2018 at <<https://www.nachi.org/360.htm>>, InterNACHI, International Association of Certified Home Inspectors, 2018, 10 pgs.

Badger, Transforming Enterprise Processes through Virtual Worlds, Forterra Systems Inc. (Year: 2008), 20 pages.

Bell, The Investigation and Application of Virtual Reality as an Educational Tool, American Society for Engineering Education 1995 Annual Conference, 1995 (Year: 1995), 11 pages.

Breading, M., "Virtual Reality in Insurance: Slow Down, You Move Too Fast", retrieved at least as early as Aug. 28, 2018 at <<https://strategymeetsaction.com/news-and-events-2/sma-blog/virtual-reality-in-insurance-slow-down-you-move-too-fast/>>, SMA, Strategy Meets Action, Aug. 2016, 2 pgs.

"How Farmers Insurance is Using Virtual Reality to Train Employees", retrieved at least as early as Aug. 28, 2018 at <<https://www.findcourses.com/prof-dev/l-d-articles/vr-training-farmers-insurance-13436>>, updated Jul. 2019, 8 pgs.

Office Action for U.S. Appl. No. 18/077,063, mailed on May 3, 2023, Little, "Adjustable Virtual Scenario-Based Training Environment". 55 pages.

Office Action for U.S. Appl. No. 16/374,107, mailed on Sep. 21, 2020, Little, "Adjustable Virtual Scenario-Based Training Environment", 35 pages.

Office Action for U.S. Appl. No. 16/374,107, mailed on Jan. 19, 2021, Little, "Adjustable Virtual Scenario-Based Training Environment", 40 pages.

Office Action for U.S. Appl. No. 16/399,005, mailed on Oct. 24, 2022, Little, "Virtual Multi-Property Training Environment", 13 pages.

Office Action for U.S. Appl. No. 16/399,005, mailed on Apr. 13, 2022, Stockweather, "Virtual Multi-Property Training Environment", 11 pages.

Office Action for U.S. Appl. No. 16/374,107, mailed on May 1, 2020, Little, "Adjustable Virtual Scenario-Based Training Environment", 28 pgs.

Vanian, J., "Farmers Insurance Is Using the Oculus Rift to Train Workers in Virtual Reality", retrieved as early as Aug. 28, 2018 at <<http://fortune.com/2017/10/25/oculus-rift-headsets-farmers-insurance:>>, Fortune., Oct. 2017, 3 pgs.

Notice of Allowance mailed Sep. 18, 2024 for related U.S. Appl. No. 18/407,583 entitled "Adjustable Virtual Scenario-Based Training Environment" (25 pages).

* cited by examiner

VIRTUAL MULTI-PROPERTY TRAINING ENVIRONMENT

CROSS-REFERENCE TO RELATED APPLICATION

This application is a continuation of and claims priority to U.S. application Ser. No. 16/399,005, filed on Apr. 30, 2019 and entitled "VIRTUAL MULTI-PROPERTY TRAINING ENVIRONMENT," the entirety of which is incorporated herein by reference.

FIELD

The present disclosure generally relates to computer-generated virtual reality (VR) environments, and more particularly, the present disclosure describes a virtual landscape including various components thereof that may be generated via procedural generation techniques.

BACKGROUND

Conventionally, insurance policies may be provided to various entities, such as persons and/or commercial entities. More specifically, these insurance policies may insure real properties (e.g., commercial or residential structures), and/or entities associated with those properties (e.g., persons or businesses owning, renting, or leasing the real properties). Eligibility for and terms of an insurance policy for a property (or entity associated therewith) generally depends upon risk associated with the property, which may be affected by various characteristics of the property itself, as well as considerations relating to the location of the property with respect to various natural elements, infrastructure, and other residential or commercial properties. A property at issue may, for example, be at increased risk of damage or liability due to weather patterns, natural disaster, or dangerous human activity. Often, an insurance "prospector" or other trained specialist may identify potential insurance customers by physically traveling to a geographical area (e.g., physical area such as a city block, shopping mall, etc.) to assess the potential insurability of multiple real properties therein, based upon observations of certain aspects of those properties that may affect risk or otherwise affect insurability.

Insurance prospecting requires a significant degree of experience. That is, a "trainee" insurance prospector must be adequately trained to expeditiously identify aspects of properties and the geographical area surrounding those properties (a "landscape") that may affect insurability. Conventionally a trainee may physically travel to an area along with a trained "expert" insurance prospector, with the expert prospector providing guidance to the trainee by directing the trainee's attention, providing tasks or hints, etc. Travel by both expert and trainee is typically preferred in these situations because the quality of existing telephony and fixed-point digital image analysis techniques (e.g., video conferences) may not allow individuals to as fully and reliably identify aspects of the landscape that may affect insurability. While these travel practices are typically accepted as necessary in actual insurance prospecting (i.e., non-training situations), the travel practices would ideally be avoidable in the process of training an insurance prospector, due at least to travel costs, inconvenience for trainer and trainee, and inconvenience for local business/property owners who may need to be present to allow the trainer and/or trainee access to a business/property. Furthermore, even when a trainee physically travels to an area for prospecting training, that area provides exposure only to a small, fixed subset of the many aspects that may affect insurability of properties and entities associated therewith.

Existing VR systems do not entirely overcome these challenges. For example, virtual environments are time-consuming to develop, and any one particular virtual environment might still only provide exposure a small subset of aspects that might affect insurability. For that reason, insofar as a trainee may seek to gain experience via a virtual environment, the trainee may require exposure to a large number of individually, manually designed virtual environments. Manual design of virtual environments requires significant time and expertise, amounting to costs and inconveniences comparable to those inherent to the aforementioned conventional training methods.

SUMMARY

The present application discloses methods, systems, and computer-readable media via which an adjustable virtual "multi-property" training environment may be generated and provided. Particularly, a "multi-property" virtual environment may include a procedurally generated "virtual landscape" representative of a theoretical geographical area (e.g., town, city block, shopping mall, etc.) in which various virtual properties may be present. The virtual properties, as well as other natural and/or man-made components of the virtual landscape, may be dynamically generated and/or adjusted via procedural generation techniques.

One or more users may enter the virtual environment to provide a mock insurance prospecting experience, in which a trainee user may identify various aspects of the generated virtual landscape that may affect insurability of one or more of the properties therein (and/or one or more entities associated therewith). The disclosed embodiments improve existing VR systems by automatically providing unique virtual landscapes without requiring manual configuration of those landscapes, thereby overcoming drawbacks of conventional virtual environment techniques. Various aspects are summarized below and described in further detail herein.

In an embodiment, a computer-implemented method may be provided for providing an adjustable virtual environment. The computer-implemented method may include (1) generating, via one or more processors, a virtual landscape representative of a theoretical geographical area comprising one or more properties, the virtual landscape comprising a plurality of components. Generating the virtual landscape may include automatically generating at least a portion of the plurality of components in accordance with a predefined rule set, and wherein the generated virtual landscape is associated with one or more aspects affecting risk to at least one of the one or more properties. The computer-implemented method may further include (2) providing, via the one or more processors, a virtual environment to a virtual environment interface device of a user, the virtual environment comprising the generated virtual landscape. The computer-implemented method may include additional, fewer, and/or alternate actions, including actions described herein.

In another embodiment, a computing system may be configured to provide an adjustable virtual environment. The computing system may include (1) one or more processors, and (2) one or more non-transitory computer memories storing non-transitory computer-executable instructions that, when executed via the one or more processors, cause the computing system to (i) generate a virtual landscape representative of a theoretical geographical area comprising one or more properties, the virtual landscape comprising a plurality of components, wherein generating the virtual landscape comprises automatically generating at least a portion of the plurality of components in accordance with a predefined rule set, and wherein the generated virtual landscape is associated with one or more aspects affecting risk to at least one of the one or more properties, and/or (ii) provide a virtual environment to a virtual environment interface device of a user, the virtual environment comprising the generated virtual landscape. The computing system may include additional, fewer, and/or alternate computing components including components described herein, and may be configured to perform additional, fewer, and/or alternate actions, including those described herein.

In yet another embodiment, one or more non-transitory computer-readable media may store non-transitory computer-executable instructions that, when executed via one or more processors, cause one or more computers to (1) generate a virtual landscape representative of a theoretical geographical area comprising one or more properties, the virtual landscape comprising a plurality of components, wherein generating the virtual landscape comprises automatically generating at least a portion of the plurality of components in accordance with a predefined rule set, and wherein the generated virtual landscape is associated with one or more aspects affecting risk to at least one of the one or more properties, and/or (2) provide a virtual environment to a virtual environment interface device of a user, the virtual environment comprising the generated virtual landscape. The one or more non-transitory computer-readable media may store additional, fewer, and/or alternate non-transitory computer-executable instructions, including those described herein.

BRIEF DESCRIPTION OF THE DRAWINGS

The figures described below depict various aspects of the applications, methods, and systems disclosed herein. It should be understood that each figure depicts an embodiment of one or more particular aspects of the disclosed applications, systems and methods, and that each of the figures is intended to accord with one or more possible embodiments thereof. Furthermore, wherever possible, the following description refers to the reference numerals included in the following figures, in which identical or functionally similar elements are depicted with like reference numerals.

DETAILED DESCRIPTION

Figure 1:
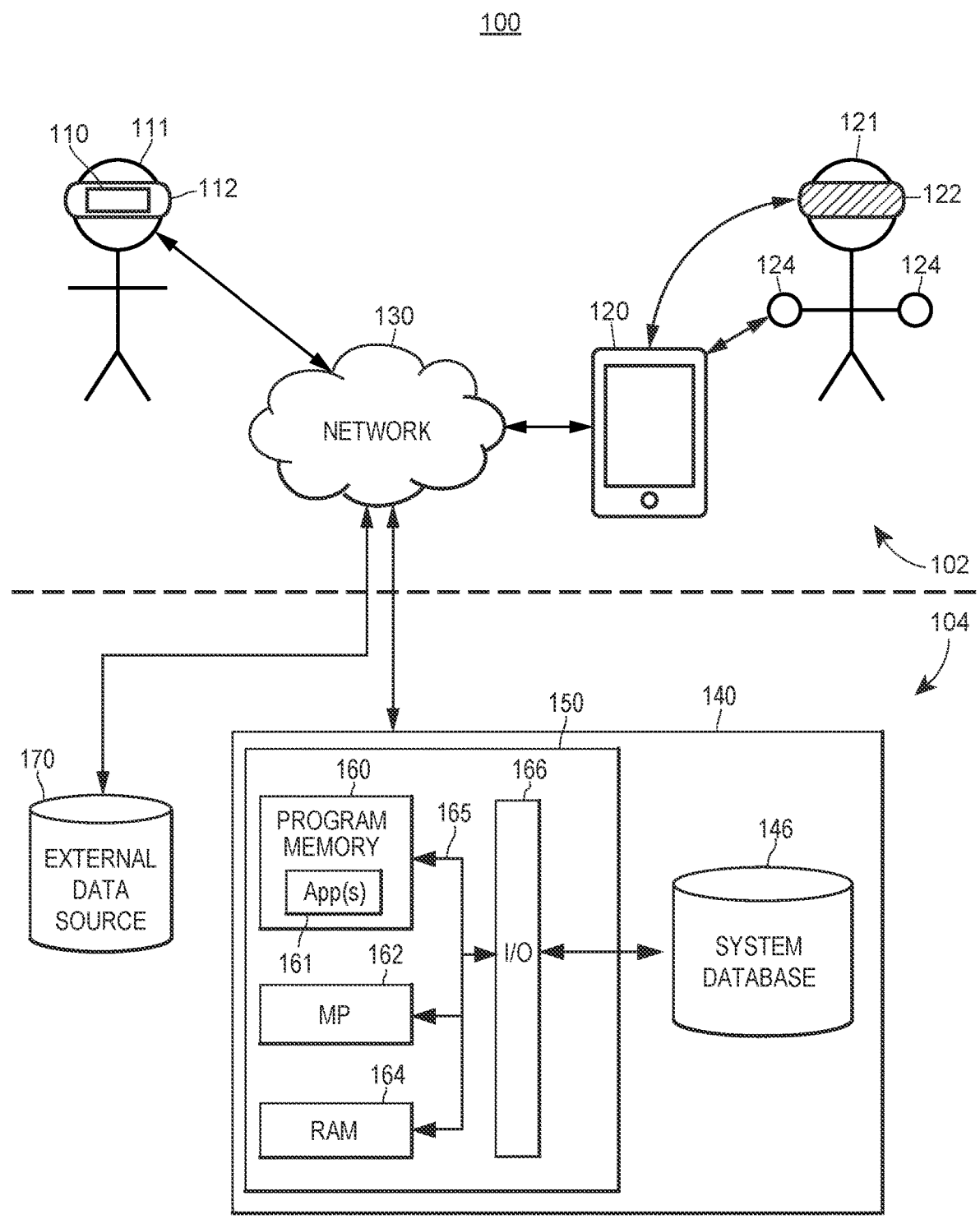
FIG. 1 illustrates a block diagram of an exemplary virtual environment system on which the methods described herein may operate, in accordance with embodiments described herein.

The systems and methods herein generally relate at least to improvements to virtual reality (VR) systems, and to improvements in the use thereof. Particularly, the systems and methods herein may generate and provide an adjustable "multi-property" virtual environment. A "multi-property" virtual environment may generally include a procedurally generated "virtual landscape" representative of a theoretical geographical area (e.g., town, city block, or shopping mall), in which various real properties may be present. These "virtual properties" may be representative of example residential properties, commercial properties, and/or other potentially insurable properties. In addition to the virtual properties, the virtual landscape may include various other components, such as natural elements (e.g., terrain, bodies of water, coastline, vegetation, etc.), infrastructural components, (e.g., roads, sidewalks, utility lines, fire hydrants, etc.), other man-made structures (e.g., various construction vehicles and/or materials), and/or other appropriate elements of a landscape. These various components of the virtual landscape may be generated partially or entirely using procedural generation techniques. The virtual landscape, once generated, is associated with a plurality of aspects of the landscape that may affect risk to one or more properties therein, or that otherwise affect insurability of one or more properties therein. For example, an aspect of the landscape may refer to a relative arrangement of a particular virtual property relative to a flood plain, which may thereby affect risk of water damage to the particular virtual property.

One or more users (e.g., insurance prospecting trainers or trainees) may enter the virtual environment via various virtual environment interface devices (e.g., a dedicated VR headset, a smartphone or other general-purpose device having VR capabilities, and/or some combination thereof). The virtual environment may implement various virtual tools to receive "user interaction data." A VR application implementing the virtual environment may, for example, implement various passive motion/focus tracking techniques, or may provide virtual tools that allow the user to actively engage with certain components of the virtual landscape. The VR system may determine, based upon the received user interaction data, whether a user has correctly or incorrectly identified an aspect of the virtual landscape that affects insurability (e.g., an aspect that increases or decreases risk to a property). Performance of a user within the virtual environment may generally be assessed based upon the user's proficiency in correctly identifying aspects of the virtual landscape that affect insurability of one or more virtual properties therein, and/or based upon higher-level determinations provided by the user (e.g., a determination whether a business or property is eligible for a particular insurance policy, based upon one, two, or more aspects of the virtual landscape).

The techniques described herein improve existing VR systems and applications by providing dynamic adjustability of a virtual environment, such that unique virtual landscapes may be automatically generated and provided to a user without requiring manual design of those landscapes. The various relative arrangements of components of virtual landscapes provide for emergent insurance prospecting scenarios, in which the user must consider diverse and complex aspects of a procedurally generated virtual landscape to thoroughly and correctly assess insurability of virtual properties.

Overview of Terms

For the sake of clarity of this detailed description, definitions of some relevant terms should first be set forth.

"Real property," "property," "one or more properties," and the like as described herein, refer to a unitary area of land that may be owned, rented, leased, or otherwise utilized by one or more persons, one or more commercial businesses, one or more non-profit organizations, and/or other entities. A real property may, for example, include a residential home, an apartment building, a commercial business, an office of a business or nonprofit organization, an area of farmland, and/or another type of property utilized for any commercial or noncommercial purposes. An "entity" or "entity associated with a real property," as described herein, refers to one or more persons, businesses, non-profit organizations, municipal entities, etc., that may own, rent, lease, or otherwise claim authority upon the real property.

Accordingly, in the context of this detailed description, a "virtual property" refers to a virtual representation of a real property. In some embodiments, the virtual property may be procedurally generated via techniques described herein, and thus the virtual property may not correspond directly to an actual real property, but rather to a property that may theoretically be present in a landscape. In some embodiments, though, virtual properties may additionally or alternatively include properties modeled to closely represent existing residential, commercial, and/or other properties. For example, a virtual property may include a particular type of construction (e.g., log, brick, or stone construction) in accordance with typical construction of a certain property and/or region that the virtual property is intended to broadly represent. Accordingly, it should be understood that, where an "entity associated with a virtual property" is described herein, the entity may not refer to an actual entity, but may rather refer to an abstract entity that would be associated with the virtual property.

A "virtual landscape," as described herein, generally refers to a virtual representation of a theoretical geographical area such as a town, city block, shopping mall, strip mall, or area upon which properties may be present. The virtual landscape is made up of various "components." Components of a virtual landscape may include (1) one or more virtual properties, including the individual parts thereof, (2) natural terrestrial or aquatic elements (e.g., hills, mountains, rocks, vegetation, rivers, streams, lakes, ponds, beaches, shorelines, etc.), (3) infrastructural components (e.g., roads, sidewalks, traffic lights, streetlights, street signs, utility pipes, radio antennas, public transportation vehicles or other vehicles, etc.), (4) other man-made structures or objects (e.g., statues, trash bins, etc.), (5) meteorological elements (e.g., clouds, rain, sun, snow, fog, and/or other elements pertaining to weather), and/or other elements including those described herein. Components of a virtual landscape may be considered modular, in that one component may be made upon of two or more "sub-components." For example, a virtual property may be made up of various sub-components thereof such as windows, walls, roofs, foundations, utility lines, furniture, etc. Moreover, components of a virtual landscape may comprise modifiable characteristics such as shape, size, rotation, material composition, color, texture, other ornamental aspects, etc. Modularity and variance of characteristics of components of a virtual landscape may facilitate uniqueness of two or more instances of any one component (e.g., two or more unique buildings or two or more unique terrain patterns).

An "aspect" of a virtual landscape may generally refer to various observable traits of the virtual landscape. An aspect of the virtual landscape may refer, for example, to (1) the presence or absence of a particular one or more components (or sub-components thereof), (2) a characteristic of a present component (e.g., construction material of a property), and/or (3) a location of a component relative to one or more other components (e.g., proximity of a property to a flood plain or to another commercial property). Aspects may affect insurability of a virtual property in that, for example, the aspect is associated with (1) increased or decreased risk to the property as a result of weather patterns or natural disasters, (2) increased or decreased risk as a result of human activity (e.g., from vehicle impact, from use/production of hazardous materials at another nearby property, and/or from utility related damage), (3) increased or decreased monetary value (e.g., due to property being situated upon or near valuable land), and/or (4) eligibility of the property to be insured under a particular category of insurance policy (e.g., homeowners insurance, renters insurance, commercial insurance, etc.). Just as an aspect of the virtual landscape may affect insurability of a property, the aspect may further affect insurability of an entity associated therewith. In an envisioned use case, an objective of a "trainee" user in the virtual environment includes correctly identifying one or more aspects of a virtual landscape that may affect insurability of a virtual property therein, and/or of an entity associated therewith.

In embodiments described herein, "procedural generation" refers to automatic generation of at least portions of a virtual landscape according to one or more computing algorithms and/or rule sets. One or more algorithms may, for example, be associated with one or more input parameters or a map seed (e.g., an initial text string or integer fed to a rule-based generator) to generate at least a portion of the components of the virtual landscape. Generating a component, as described herein, may include determining any appropriate sub-components or characteristics of that component as described above (e.g., to define size, placement, and relative arrangement of components). Procedural generation techniques may operate within confines of one or more predefined rules which may, for example, define conditions upon which certain components of the virtual landscape may appear, or define a manner in which components can or cannot be relatively arranged. In some embodiments, procedural generation techniques may include use of components and/or rules from a preexisting library of components and/or rules stored at one or more computing devices.

Use of procedural generation techniques thus stands in contrast to conventional techniques typically used in virtual environment generation for training. According to such techniques, each and every component of the virtual environment may need to be manually selected and placed by a human programmer or designer, without potential for variability across two or more virtual environments except through manual configuration of those two or more environments by the human.

The virtual environment may implement various "virtual tools" via which a user may interact with the virtual environment, and via which one or more computing devices implementing the virtual environment may obtain "user interaction data" in accordance with the user's interaction with the environment. Without limitation, implemented virtual tools may include (1) "user tools" actively engaged by the users to move about the virtual environment and/or manipulate the environment (to grab, collect, move, or annotate potentially significant components) and/or (2) "tracking tools" employed by the one or more computing devices implementing the virtual environment to detect user interaction independently of active input by the user (e.g., an eye tracking tool, a field of vision tracking tool, a visual focus tracking tool, etc.). One or more computing devices may determine, based upon received user interaction data, whether the user has correctly identified one or more aspects affecting insurability of a virtual property and/or entity associated therewith.

Exemplary Computing Environment

FIG. 1 illustrates a block diagram of an exemplary virtual environment system 100 that may operate to implement (e.g., generate and provide to one or more users) a virtual environment including a procedurally generated virtual landscape. The high-level architecture includes both hardware and software applications, as well as various data communications channels for communicating data between the various hardware and software components. The virtual environment system 100 may include additional, fewer, and/or alternate computing components, including those described herein. The virtual environment system 100 may be roughly divided into front-end components 102 and back-end components 104.

The front-end components 102 generally may allow one or more users to interact with a virtual environment via one or more virtual environment interface devices that may be physically accessible to the one or more users. Generally, such one or more virtual environment interface devices may include (1) one or more computing devices suitable for performing local processing, transmitting data over one or more networks, processing user input, and/or other computing actions described herein, and (2) one or more display/input devices suitable for visually and/or otherwise presenting a virtual environment, receiving user input, etc. Accordingly, as depicted by FIG. 1 and described herein, one or more virtual environment interfaces may include, for example, a mobile computing device 110 (e.g., a smartphone) and/or a dedicated virtual reality (VR) system 120. It should be appreciated, though, that other types and combinations of virtual environment interface devices may be used (e.g., various mobile or stationary computing devices, wearable computing devices, and/or other devices described herein).

In any case, the front-end components 102 may communicate with the back-end components 104 via a network 130 (i.e., one or more networks). Generally, the back-end components 104 may include one or more servers 140 that may communicate with the front-end components 102 and/or one or more external data sources 170. In some embodiments, as will be described in subsequent sections of this detailed description, the one or more servers 140 may be configured to provide a virtual environment simultaneously to two or more users via communications over the network 130. The network 130 may include a proprietary network, a secure public internet, a virtual private network or some other type of network, such as dedicated access lines, plain ordinary telephone lines, satellite links, cellular data networks, combinations of these, and/or other network(s). Where the network 130 comprises the Internet, data communications may take place over the network 130 via an Internet communication protocol.

Returning to the discussion of the front-end components 102, an example mobile computing device 110 may be associated with a mobile device user 111. The mobile computing device 110 may include a tablet computer, smartphone, wearable computer device (e.g., backpack, headset, or smart watch), and/or similar devices. The mobile computing device 110 may include one or more position sensors (e.g., accelerometers, gyroscopes, or inertial measurement units) and a display screen. The positions sensors may provide data regarding position and movement of the mobile computing device 110 to facilitate determination of position or viewing perspective within the virtual environment. The display screen may be used to present a visual representation of a view of the virtual environment. The mobile device user 111 may thereby interact with the mobile computing device 110 to access and navigate a virtual environment, in accordance with embodiments described herein. Use of the mobile computing device 110 by the mobile device user 111 may include mounting the mobile computing device 110 within a head mount 112 (and/or another equivalent mounting apparatus) for hands-free use and a more immersive user experience, in some embodiments.

An example virtual reality system 120 may include a general-purpose computer and/or a special-purpose computer specifically designed for virtual reality applications. Accordingly, the virtual reality system 120 may include, for example, a stationary computer (e.g., desktop PC), mobile computing device, wearable device (e.g., backpack-mounted computer), and/or any suitable combinations thereof. The virtual reality system 120 may include or interface with one or more displays 122 to present a visual representation of a view of the virtual environment to the VR system user 121. Furthermore, the virtual reality system 120 may include or interface with one or more input devices 124 (e.g., wired/wireless handheld input devices) to receive user input (i.e., user interaction) from the VR system user 121. In some embodiments, a display 122 and input devices 124 may be connected to the virtual reality system 120 as peripheral components. Moreover, in some embodiments, the display 122 and/or the one or more input devices 124 may similarly interface with the example mobile computing device 110 and/or other virtual environment interface devices described herein.

Although only one mobile computing device 110 of one mobile device user 111 and one virtual reality system 120 of one VR system user 121 are illustrated, it will be understood that, in some embodiments, various combinations of virtual environment interface devices and users thereof are envisioned. For example, the front-end components 102 may include any suitable number of virtual environment interface devices, including any devices or combinations of devices described herein. Moreover, in some embodiments, a single virtual environment interface device may provide a virtual environment to two or more users.

Naturally, computing capabilities may significantly differ among various virtual environment interface devices utilized to access a virtual environment. For example, a special-purpose, dedicated virtual reality device may, in some circumstances, have superior processing and/or display capabilities when compared to some general-purpose laptop computers, desktop computers, and smartphones.

Accordingly, in some embodiments, the server 140 may adaptively implement a virtual environment according to the computing capabilities of one or more front-end components to be used to access the virtual environment, in some embodiments. In some embodiments, for example, one or more virtual environment interface devices among the front-end components 102 may include a "thin-client" device, wherein computing actions by the thin-client device may be limited, for example, to just those necessary computing actions to visually display a virtual environment and/or receive user input, while back-end components 104 perform most or all remaining computing actions to generate a virtual environment, analyze user input, etc. Such techniques may be particularly effective, for example, in emerging 5G computing networks and other networks characterized by high data transmission rates.

Each virtual environment interface device may include any number of internal sensors and may be further communicatively connected to one or more external sensors by any known wired or wireless means (e.g., USB cables, Bluetooth communication, etc.). The mobile computing device 110 and virtual reality system 120 are further discussed below with respect to FIG. 2.

It should be noted that, in this detailed description, "user" or similar terms may be used as shorthand to refer to a front-end component 102 performing actions and/or accessing data in association with a human user. Thus, as an example, "providing a virtual environment to a user" may comprise providing a virtual environment to one or more front-end components 102 for use by a user. Similarly, "receiving data from a user," or similar terms, may refer to receiving data transmitted via one or more front-end components automatically or in response to input by a user at the one or more front-end components 102. The back-end components 104 may include one or more servers 140 communicatively connected to the network 130. Each server 140 may include one or more processors 162 adapted and configured to execute various software applications and components of the virtual environment system 100, in addition to other software applications. The server 140 may further include a database 146, which may be adapted to store data related to the system 100, such as virtual environments, virtual landscapes, graphical assets used to generate virtual landscapes, rules used to generate virtual landscapes, user interaction data, image/video captures from virtual environments, and/or similar data, which the server 140 may access to perform actions described herein. The server 140 may include a controller 150 that is operatively connected to the database 146. It should be noted that, while not shown, additional databases may be linked to the controller 150 in a known manner. The controller 150 may include a program memory 160, a processor 162, a RAM 164, and an I/O circuit 166, all of which may be interconnected via an address/data bus 165. It should be appreciated that although only one microprocessor 162 is shown, the controller 150 may include multiple microprocessors 162. Similarly, the memory of the controller 150 may include multiple RAMs 164 and multiple program memories 160. Although the I/O circuit 166 is shown as a single block, it should be appreciated that the I/O circuit 166 may include a number of different types of I/O circuits, which may process user input (e.g., via keyboard, mouse, voice, etc.) and/or provide user output (e.g., via a visual display, audio output device, etc.). The RAM 164 and program memories 160 may be implemented as semiconductor memories, magnetically readable memories, or optically readable memories, for example.

The server 140 may further include a number of software applications or routines 161 ("App(s)") stored in the program memory 160. In some embodiments, these applications or routines 161 may form modules when implemented by the processor 162, which modules may implement part or all of the methods described below to implement virtual environments among one or more users, record sessions within virtual environments, present recordings of virtual environment sessions, and/or process user interaction in virtual environments. In some embodiments, such modules may include one or more of a virtual landscape generation module, a communication channel module, a collaborative session management module, a virtual environment presentation module, a data recordation module, and/or a review module. In some embodiments, the modules may include one or more modules that enable a user to define, via one or more interactive graphical user interfaces, graphical assets to be used as components within virtual landscape, and/or rule sets to be used in generation of components of virtual landscapes. User-defined graphical assets and/or rules may be stored via the system database 146, in some embodiments.

The back-end components 104 may further include one or more external data sources 170, communicatively connected to the network 130. The one or more external data sources 170 may, for example, include public or proprietary databases storing information that may be associated with physical real properties such as ownership records, zoning data, tax assessments, environmental reports, business listings, or insurance policies. In some embodiments, such information retrieved via the one or more external data sources may be used to generate rule sets for use in generating virtual landscapes, so as to generate virtual landscapes that realistically resemble hypothetical physical environments. Additionally or alternatively, in some embodiments, the one or more external data sources 170 may include graphical assets and/or rules that may be used to generate components of virtual landscapes.

Exemplary Virtual Environment Interface Device

Figure 2:
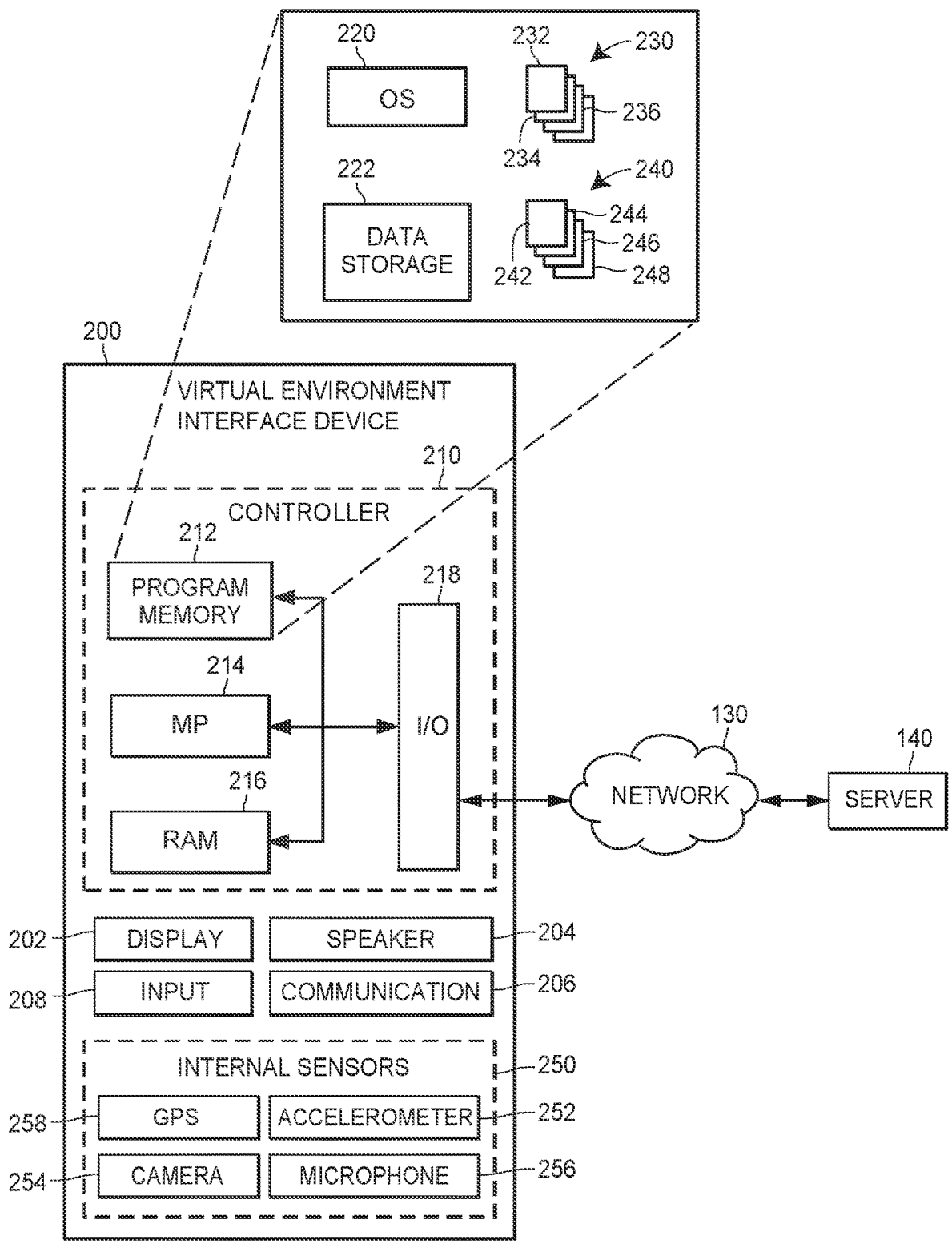
FIG. 2 illustrates a block diagram of an exemplary virtual environment interface device via which a user may access a virtual environment, in accordance with embodiments described herein.

FIG. 2 illustrates a block diagram of an exemplary virtual environment interface device 200 that may provide access to virtual environments. The virtual environment interface device 200 may include any suitable device or combination of devices described herein (e.g., the example mobile computing device 110, the example virtual reality system 120, etc.).

The virtual environment interface device 200 includes one or more internal sensors 250 which may provide sensor data regarding a local physical environment in which the virtual environment interface device 200 is operating. In some embodiments, one or more of such internal sensors 250 may be integrated into an inertial measurement unit (IMU)). Sensor data provided via the one or more sensors 250 data may include, for example, accelerometer data, rotational data, and/or other data used to position the virtual environment interface device 200 within its local physical environment. Position of the virtual environment interface device 200 may, in turn, be used to position and navigate (e.g., move, rotate, etc.) the user within the virtual environment. In some embodiments, any of the sensors discussed herein may be peripheral to the virtual environment interface device 200. In any case, the sensor data may be processed by the controller 210 to facilitate user interaction with the virtual environment, as discussed elsewhere herein. Additionally, or alternatively, the sensor data may be transmitted to one or more processors 162 of the server 140 through the network 130 for processing.

The virtual environment interface device 200 includes a display 202, which may be used to present a visual representation of the virtual environment to the user. The visual representation of the virtual environment includes a plurality of views at positions within the virtual environment, which are presented to the user as the user navigates around the virtual environment. The virtual environment interface device 200 also includes a speaker 204, which may be used to present sounds associated with the virtual environment or communications from other users during a virtual environment session. The virtual environment interface device 200 likewise includes an input 208 to receive user input from the user, which may include various user interactions with the virtual environment, in some embodiments. Each of the display 202, speaker 204, or input 208 may be integrated into the virtual environment interface device 200 or may be communicatively connected thereto.

The display 202 may include any known or hereafter developed visual or tactile display technology, including LCD, OLED, AMOLED, projection displays, refreshable braille displays, haptic displays, or other types of displays. The one or more speakers 204 may similarly include any controllable audible output device or component. In some embodiments, communicatively connected speakers 204 may be used (e.g., headphones, Bluetooth headsets, docking stations with additional speakers, etc.). Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The internal sensors 250 may include any devices or components mentioned herein, along with other extant devices suitable for capturing data regarding a physical environment of a virtual environment interface device 200 or presenting communication data or data regarding a virtual environment (e.g., representations of components of virtual landscapes or representations of user annotations within the virtual landscape). In some embodiments, the sensors 250 may further include additional sensors configured or intended for other uses, such as geolocation, photography, or spatial orientation (e.g., position and/or rotation) of the device.

Although discussion of all possible sensors of the mobile computing device 110 would be impractical, if not impossible, several particular sensors warrant particular discussion. Disposed within the virtual environment interface device 200, the internal sensors 250 may include an accelerometer 252, a camera 254, a microphone 256, and/or a GPS unit 258. Any or all of these may be used to generate sensor data used in generating or interacting with virtual environments representing theoretical geographical areas. Additionally, other types of currently available or later-developed sensors (e.g., a gyroscope and/or magnetometer) may be included in some embodiments. In some embodiments, the one or more internal sensors 250 may include one or more external sensors communicatively connected to the mobile computing devices. Such sensors may, for example, be disposed within one or more input devices 124, or may be standalone sensors communicatively connected to other computing elements described herein.

The accelerometer 252 may include one or more accelerometers positioned to determine the force and direction of movements of the virtual environment interface device 200. In some embodiments, the accelerometer 252 may include a separate X-axis accelerometer, Y-axis accelerometer, and Z-axis accelerometer to measure the force and direction of movement in each dimension, respectively. It will be appreciated by those of ordinary skill in the art that a three-dimensional vector describing a movement of the virtual environment interface device 200 through three-dimensional space can be established by combining the outputs of the X-axis, Y-axis, and Z-axis accelerometers using known methods.

Similarly, other components may provide additional positioning or movement sensor data. In some embodiments, a gyroscope may be used in addition to, or instead of, the accelerometer 252 to determine movement of the virtual environment interface device 200. For example, a MEMS gyroscope may be included within the virtual environment interface device 200 to detect movement of the virtual environment interface device 200 in three-dimensional physical space. Of course, it should be understood that other types of gyroscopes or other types of movement-detecting sensors (e.g., a magnetometer) may be used in various embodiments. Such sensor data may be used to determine a relative position of the virtual environment interface device 200 within its local physical environment. In some instances, such relative position information may be used to navigate an existing virtual environment by movements of the virtual environment interface device 200 within the local physical environment.

The camera 254 (i.e., one or more camera devices) may be used, for example, to monitor and provide tracking data for a VR headset and/or another virtual environment interface device 200. Additionally or alternatively, the camera 254 may provide hand or finger tracking of the user in the local physical environment. Still additionally or alternatively, the camera 254 may capture the local physical environment to provide a "pass-through" view of the local physical environment, such that a user whose local environment may be obscured by a VR headset may obtain at least a partial view of people and/or objects in the local physical environment, while simultaneously interacting with the virtual environment. One or more cameras 254 disposed within the virtual environment interface device may include an optical camera, an infrared camera, and/or other types of cameras.

The microphone 256 may be used to detect sounds within the local physical environment, such as spoken notes or comments by the user of the virtual environment interface device 200, which spoken notes or comments may be used to detect a user's identification of aspects of a virtual landscape that may affect insurability, and/or to add annotations within a virtual landscape. In some embodiments, microphone 256 may likewise be used to capture spoken messages for communication between two or more users during a virtual session. One or more microphones 256 may be disposed within the virtual environment interface device 200 or may be communicatively connected thereto. For example, wired or wireless microphones 256 may be communicatively connected to the virtual environment interface device 200, such as wireless speaker/microphone combination devices communicatively paired with the virtual environment interface device 200.

The GPS unit 258 may provide information regarding the location or movement of the virtual environment interface device 200. The GPS unit 258 may use "Assisted GPS" (A-GPS), satellite GPS, or any other suitable global positioning protocol (e.g., the GLONASS system operated by the Russian government) or system that locates the position of the virtual environment interface device 200. For example, A-GPS utilizes terrestrial cell phone towers or Wi-Fi hotspots (e.g., wireless router points) to more accurately and more quickly determine location of the virtual environment interface device 200, while satellite GPS generally is more useful in more remote regions that lack cell towers or Wi-Fi hotspots.

The virtual environment interface device 200 may also communicate with the server 140, the one or more external data sources 170, and/or other components via the network 130. For example, the virtual environment interface device 200 may communicate with another virtual environment interface device 200 (e.g., another front-end component 102 depicted in FIG. 1) during a virtual session by communication through the server 140 via the network 130. Such communication may involve the communication unit 206, which may manage communication between the controller 210 and external devices (e.g., network components of the network 130, etc.). The communication unit 206 may further transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, and/or other output from the controller 210 to the server 140 or other devices via the network 130.

The virtual environment interface device 200 further includes a controller 210 that may receive, process, produce, transmit, and/or store data. The controller 210 may include a program memory 212, one or more microcontrollers or microprocessors (MP) 214, a random access memory (RAM) 216, and/or an I/O circuit 218. The components of the controller 210 may be interconnected via an address/data bus or via other means. It should be appreciated that although FIG. 2 depicts only one microprocessor 214, the controller 210 may include multiple microprocessors 214, in some embodiments. Similarly, the memory of the controller 210 may include multiple RAMs 216 and multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memory 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the virtual environment interface device 200. Moreover, in some embodiments, such as thin-client implementations, additional processing and data storage may be provided by the server 140 via the network 130.

The software applications 230 and routines 240 may include computer-readable instructions that cause the processor 214 to implement various functions of virtual environment sessions, as described herein. Thus, the software applications 230 may include a virtual reality application 232 to present a virtual environment to a user, a communication application 234 to send and receive real-time communication with one or more other users via a communication channel, and a network communication application 236 to receive and transmit data via the network 130. The software routines 240 may support the software applications 230 and may include routines such as a relative position tracking routine 242 to process sensor data to maintain a relative position of the virtual environment interface device 200 within a physical environment, a virtual position tracking routine 244 for determining a corresponding virtual position within the virtual environment, a user annotation routine 246 to generate user annotations within the virtual environment based upon user input, and/or a virtual object measurement routine 248 to determine physical dimensions or measurements based upon virtual measurements within the virtual environment. It should be understood that additional or alternative applications 230 or routines 240 may be included in the program memory 212, including web browsers or other applications.

In some embodiments, the virtual environment interface device 200 may include a wearable computing device or may be communicatively connected to a wearable computing device. In such embodiments, part or all of the functions and capabilities of the virtual environment interface device 200 may be performed by or disposed within the wearable computing device. Additionally, or alternatively, the wearable computing device may supplement or complement the virtual environment interface device 200. For example, the virtual environment interface device 200 may be communicatively connected to a smart watch or head-mounted display. Additionally or alternatively, in some embodiments, the virtual environment interface device 200 may be communicatively connected to further auxiliary devices mounted on feet, hips, hands, etc. of the user. Such further tracking devices may provide auxiliary tracking capabilities to better monitor the user's interaction with the virtual environment, and/or may provide feedback (e.g., haptic feedback) to enhance a user's experience in the virtual environment.

Various embodiments of the virtual environment system 100 described above and illustrated in FIGS. 1-2 may be utilized to perform the methods discussed further below.

Procedural Generation Techniques

"Procedural generation" refers to computing techniques via which data structures may be generated algorithmically, as opposed to manually. In embodiments described herein, procedural generation techniques may be used to generate at least a portion of virtual landscapes algorithmically to produce virtual properties, natural elements, infrastructural components, other man-made structures, and/or other virtual landscape components described herein. These techniques may be implemented, for example, via computing components depicted in FIGS. 1 and 2, and/or via other suitable computing components. Though particular examples will be provided herein, these examples should not be interpreted as limiting. Various techniques will be described herein, and may be utilized in combination, where appropriate, to generate at least a portion of a virtual landscape.

Procedural generation techniques may be utilized to generate any of the components of virtual landscapes described herein, including various "high-level" components of the virtual landscape (e.g., terrain layout and major landmarks, commercial and residential properties, roads, meteorological elements, etc.), up to and including more detailed "low-level" components of the virtual landscape (e.g., minor infrastructural elements, vehicles, sub-components of larger components, etc.). Accordingly, via implementation of these techniques, any two or more generated virtual landscapes may vary at any level of detail. In some implementations, a level of detail at which procedural generation techniques are applied (or are not applied) may be adjusted according to intended use of the virtual landscapes. For example, in use cases in which it is intended for an insurance prospecting trainee to particularly focus on the role of geography and weather in assessing insurability (e.g., risk of flooding or natural disaster), procedural generation techniques may particularly be applied at high levels of the virtual landscape to provide uniqueness of geography in a virtual landscape. Additionally or alternatively, in use cases in which it is intended for the trainee to particularly focus on determining eligibility of virtual properties for particular insurance policies (e.g., homeowners insurance, renters insurance, commercial insurance, etc.), procedural generations may particularly be applied to provide uniqueness of multiple virtual properties in the virtual landscape.

Computing assets for use in creation of virtual landscapes may be sourced from one or more data sources, such as the system database 146 and/or the external data source 170 depicted in FIG. 1. Such assets may include, for example, graphical objects, such as shapes, colors, textures, and the like, corresponding to components of virtual landscapes. Such assets may additionally or alternatively include other digital assets (e.g., audio files) that may be implemented in the virtual environment described herein.

Methods for using procedural generation techniques to generate a virtual landscape may follow a "top-down" approach, in which high-level components may first be generated, followed by increasingly lower-level components until a virtual landscape is appropriately populated. Various procedural generation rules may be applied govern the generation of components of a virtual landscape, including the relative arrangements of those aspects. By way of example, procedural generation rules may include:
  rules confining geometrical intersection of components (e.g., to prevent overlap of properties, structures, and other objects);
  rules defining a "terrain layout" of the landscape (e.g., flatness or elevation of land, arrangement of terrestrial and aquatic features, etc.);
  rules constraining high-level arrangements of infrastructural components (e.g., manner in which roads intersect, appropriate placement of signage and traffic lights, connection of utility components, use of particular construction materials such as log, brick, or stone, etc.);
  rules defining a minimum and/or maximum number of certain components of the virtual landscape (e.g., constraining a virtual landscape to include no fewer than three and no more than twelve virtual properties); and/or rules defining types of landscapes in which a component may appear (e.g., whether a property that may appear in landscapes representing urban, suburban, or rural areas, or in landscapes representing a particular state, province, region, or ZIP code);
The application of procedural generation rules may ensure that a generated virtual landscape realistically resembles a theoretical geographical area. Moreover, a "top-down" application of these rules may include upward propagation of rules conflicts in which resolution of a "low-level" rules conflict results in further conflicts.

In some embodiments, procedural generation algorithms generate various components of a virtual landscape based upon an initial "map seed" such as a text string or integer, which may be randomly initialized. Upon defining of the map seed, at least a portion of (e.g., at least some components of) a virtual landscape may be generated based upon the map seed and within the bounds of the predefined rule set. Use of an initial seed value may be particularly useful in that, if the subsequently applied rules are applied deterministically (i.e., without further randomness), a virtual landscape may be represented by the map seed itself. Accordingly, a virtual landscape may be saved and/or shared via reference the map seed itself, without requiring the larger virtual landscape to be stored locally or transmitted over a network.

In some embodiments, at least a portion of a virtual landscape may be generated based at least in part upon one or more other initial parameter values. An initial parameter value may define, for example, that a virtual landscape is intended to generally represent an urban, suburban, or rural area, a coastal area or a mainland area, a particular state, province, region, or ZIP code, etc. Based upon such initial parameters, a rule set for use in generating the virtual landscape may constrain the particular components (e.g., weather elements, specific types of buildings, specific types of geography or vegetation, common construction materials, etc.) to be used to generate the virtual landscape to more closely represent a particular geographical area. Such rules may be defined based upon analysis of various available data such as meteorological data, environmental reports, zoning data, and/or other data described herein (e.g., data stored at the system database 146 and/or external data source 170). Via these techniques, procedurally generated virtual landscapes may more specifically represent certain types of geographical areas to provide relevant training experiences for the user.

Example Virtual Landscape

Figure 3:
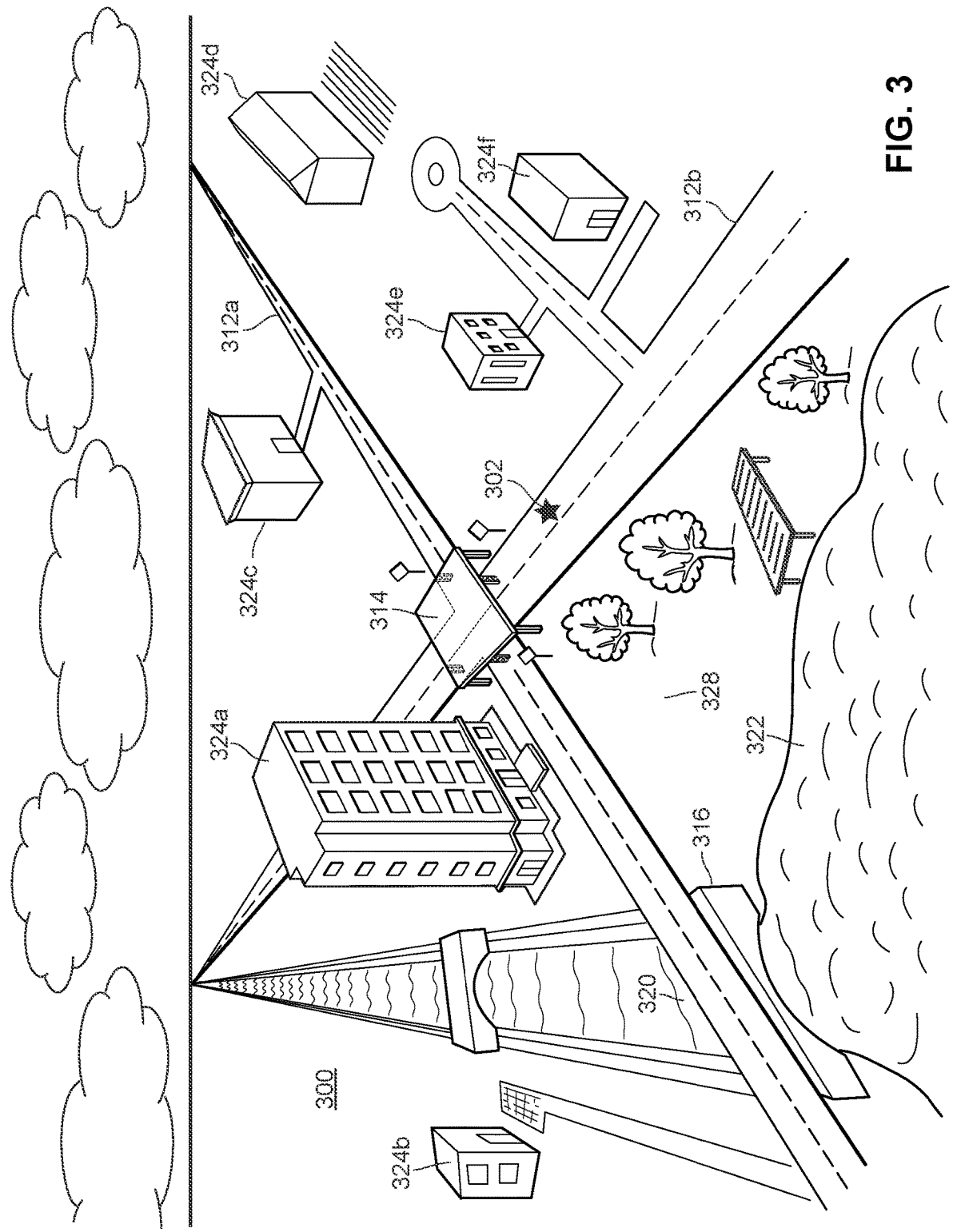
FIG. 3 illustrates an exemplary virtual landscape within the virtual environment, the exemplary virtual landscape being generated at least in part via procedural generation techniques described herein.

FIG. 3 illustrates an example virtual landscape 300 that may be generated and provided to one or more users in a virtual environment via the techniques described herein. The virtual landscape 300 may be generated and provided via computing elements of the virtual environment system depicted in FIGS. 1 and/or 2, and/or via other suitable computing elements. The virtual landscape 300 may include additional, fewer, or alternate elements to those depicted in FIG. 3, including any components of a virtual landscape described in this detailed description.

The view of the virtual landscape 300 in FIG. 3 corresponds to just one possible view of the three-dimensional virtual space of the virtual landscape 300. While this "overhead" view is provided for clarity and ease of description, a typical view for a user in the virtual landscape may correspond to a viewing perspective (e.g., position and viewing angle) of a user 302 (also referred to herein as "user position 302"). The viewing perspective of the user 302 may vary in accordance with the user's navigation about the virtual landscape 300 using tools described herein, and thus, numerous views of the virtual landscape 300 are possible. Although a view from the perspective of the user 302 typically may be a "ground-level" view, the user 302 may, in some embodiments, move vertically about the virtual landscape 300 so as to achieve an overhead view of the virtual landscape 300 resembling the view illustrated in FIG. 3.

The layout of the virtual landscape 300 generally includes terrain upon which two major roads 312*a* and 312*b* are situated. The roads 314*a* and 312*b* intersect at an intersection 314. Various components may be present at the intersection 314, including but not limited to signs, traffic lights, vehicles, and/or utility components (e.g., power lines) providing electricity to and/or other components of the virtual landscape 300. The road 312*a* includes a bridge portion 316 via which the road 312*a* passes over a river 320. The river 320 passes under the bridge portion 316 and leads into a lake 322.

The virtual landscape 300 includes a plurality of virtual properties 324*a*-324*f*, which may include various commercial properties, residential properties, and/or other properties described herein, including combinations thereof. For example, the multi-level virtual property 324*a* may include a commercial property on a first floor, and other virtual commercial and/or residential properties on second, third, and fourth floors. Accordingly, any virtual property may be associated with one or more entities (e.g., property owners, renters, lessors, etc.). In some embodiments, the virtual landscape 300 may additionally or alternatively include an "undeveloped" property 328, i.e., a property upon which a structure is not yet present or fully constructed, but which may still be considered for insurability based upon one or more aspects of the virtual landscape 300.

Various characteristics of the virtual landscape 300 may be randomly generated according to the techniques described herein. For example, procedural generation techniques may be applied to determine (1) material composition of structures upon the virtual properties 324*a*-324*f*, (2) varying elevation of the terrain of the virtual landscape 300, (3) rotation, size, and/or placement of various components of the virtual landscape 300, and/or (4) meteorological elements (e.g., clouds, rain, etc.) of the virtual landscape 300.

Generally, an objective of the user 302 in the virtual landscape 300 is to identify one or more aspects affecting insurability of one or more virtual properties depicted therein. The user 302 may determine, for example, that a commercial property on the first floor of the virtual property 324 is associated with a business that is eligible for commercial insurance, but that is at increased risk of water-related damage in the event of flooding of the river 320. As another example, the user 302 may identify a construction material of a structure upon the virtual property 324*d*, to determine risk of damage to 324*d* (e.g., as a result of weather, natural disaster, human activity, etc.). As another example, the user 302 may identify that value (and thus, insurability) of the virtual property of the virtual property 328 may be affected by its proximity to the lake 322, even though a structure is not yet fully developed upon the virtual property 328. As will be described further herein, the virtual landscape 300 may incorporate various virtual tools that enable a user to identify one or more aspects affecting insurability of one or more virtual properties in the virtual landscape 300.

In some embodiments, a view of the user 302 in the virtual landscape 300 may comprise only a portion of the above-described components of the virtual landscape 300. In particular, due to computing limitations such as limited RAM, a view of the user 302 may be adjusted based upon computing capabilities of the device at which the virtual landscape 300 is provided. For example, when certain components of the virtual landscape 300 are outside of a limited "draw distance" of the user 302, are only in the periphery of the viewing angle of the user 302, or are obstructed by other components of the virtual landscape 300, the view of the virtual landscape 300 (1) limit graphical resolution of those certain components, (2) limit the visual detail of those certain components (e.g., by not including smaller "sub-components"), and/or (3) may omit those certain components entirely.

Task Arrangement

In exemplary use cases in which one or more users of the virtual environment include an insurance prospecting trainee, an objective of the user may generally include identifying one or more aspects of a virtual landscape that affect insurability (e.g., risk and/or categorical eligibility) of virtual property therein and/or an entity associated therewith. To facilitate identification of aspects of a virtual landscape that affect insurability, one or more tasks may be provided to the user before entering the virtual landscape, and/or while the user is within the virtual landscape. These one or more tasks may, for example, correspond to tasks which an expert insurance prospector may be expected to perform when surveying a geographical area for potential insurance customers. Accordingly, each task may be associated with identification of zero, one, or more aspects of the virtual landscape that affect insurability. That is, completion of a task may result in positive identification of one or more aspects of the virtual landscape that affect insurability. By way of example, tasks associated with a virtual landscape may include:

- identifying one or more virtual properties already insured by the user (e.g., based upon a mock "existing customer list" provided to the user);
- identifying risk due to climatological/weather effects (e.g., risk of flooding or other natural disaster); and/or
- estimating a monetary value of one or more virtual properties;
- navigating within and fully around (e.g., in a circle around) a particular virtual property to identify its structural materials or condition.

In some embodiments, a trained insurance prospector may manually define tasks associated with a particular virtual landscape. In some embodiments, at least some tasks may be common to two or more generated virtual landscapes. In some embodiments, one or more computing elements may, upon generation of a virtual landscape, automatically generate one or more tasks to be provided to the user therein. Furthermore, in some embodiments, only a partial list of tasks may be provided to the user, where one or more hidden tasks are further expected of the user in the virtual landscape.

In some embodiments, a dedicated portion of the virtual environment (e.g., separate from the virtual landscape) may be generated and provided for arranging a task list prior to the user entering a virtual landscape. This dedicated portion of the virtual environment may represent a virtual office in which one or more users may arrange a task list for the virtual landscape, arrange relevant tools/materials for use in analyzing the virtual landscape, review relevant data relating to the virtual landscape, or perform other preparatory actions traditionally expected of an insurance prospecting specialist.

A procedurally generated virtual landscape may be associated with a number of observable aspects thereof that affect insurability of one or more virtual properties (and/or entities associated therewith). In some embodiments, upon generation of the virtual landscape, further logic may be automatically applied to determine the aspects affecting insurability based upon, (1) the presence of certain components in the virtual landscape, (2) characteristics of certain components (e.g., structural material or decay of a component of a virtual property), (3) relative arrangements of two or more components (e.g., location of a virtual property upon a flood plain), and/or other criteria described herein. Additionally or alternatively, a trained insurance prospecting specialist may enter the virtual landscape to manually identify the one or more aspects affecting insurability.

Environment Interaction and Performance Evaluation

The virtual environment may implement various virtual tools such that the user may successfully identify aspects of the virtual landscape affecting insurability of a virtual property and/or entity associated therewith. Generally, use of these virtual tools by the user may cause data (i.e., user interaction data) to be transmitted to the server 140, and the server 140 may, based upon the user interaction data received at the server, (1) alter the user's view within the virtual environment, and/or (2) determine whether the user has identified an aspect of the virtual landscape affecting insurability.

Virtual tools may include various tools for navigating the virtual environment. Such tools may include, for example, tools that enable a user to move (1) along roads, sidewalks, or other appropriate paths in the virtual landscape, (2) around and/or into the interior of virtual properties. In some embodiments, virtual movement tools available to a user may correspond to realistic movement in an actual physical area (e.g., in terms of movement speed and adherences to roads, doorways, etc.). Alternatively, in some embodiments, virtual movement tools may provide accelerated movement speed within the virtual landscape, and/or may provide for views of the virtual landscape that may not realistically be available to an insurance prospector in an actual physical area (e.g., the "overhead view" depicted in FIG. 3).

Virtual tools may additionally or alternatively include various user tools via which the user may actively "annotate" the virtual landscape. Such tools may include, for example, drawing tools, highlighting tools, comment tools, voice tools, etc. In some embodiments, user tools may include a camera tool and/or a recording tool, via which the user may capture still images and/or video clips that focus on particular components of the virtual landscape. Based upon a data capture command by the user, the server 140 may store an image and/or video recording of at least a portion of the virtual landscape, and may analyze the stored image and/or video to determine whether the user has identified an aspect of the virtual landscape affecting insurability. In some embodiments, use of these tools may cause additional controls, such as a drop-down tool or radio button tool, to be displayed within the virtual landscape to provide additional user interaction data regarding the captured component(s) of the virtual landscape.

In some embodiments, user tools may further enable the user to grab, collect, or otherwise manipulate particular components of the virtual landscape. In some embodiments, use of such manipulation tools may cause additional controls, such as the drop-down tool or radio button tool as described above, to be displayed within the virtual landscape to provide additional user interaction data regarding the user's observations of the manipulated component.

Virtual tools in the virtual environment may additionally or alternatively include various tracking tools, via which the server 140 may receive user interaction data to track user interaction with a virtual landscape, independently of "active" user input. These tools may, for example, include a field of view tracking tool and/or a visual focus tracking tool. The server 140 may determine, based upon received user interaction data, to which component(s) of the virtual landscape a user's attention is directed, for how long the user's attention is directed to the component(s), for what percentage of a user's session the user is positioned near or facing the component(s), etc. Based upon one or more of these determinations, the server 140 may determine whether the user has identified one or more aspects of the virtual landscape that affect insurability of one or more virtual properties and/or entities.

Figure 4:
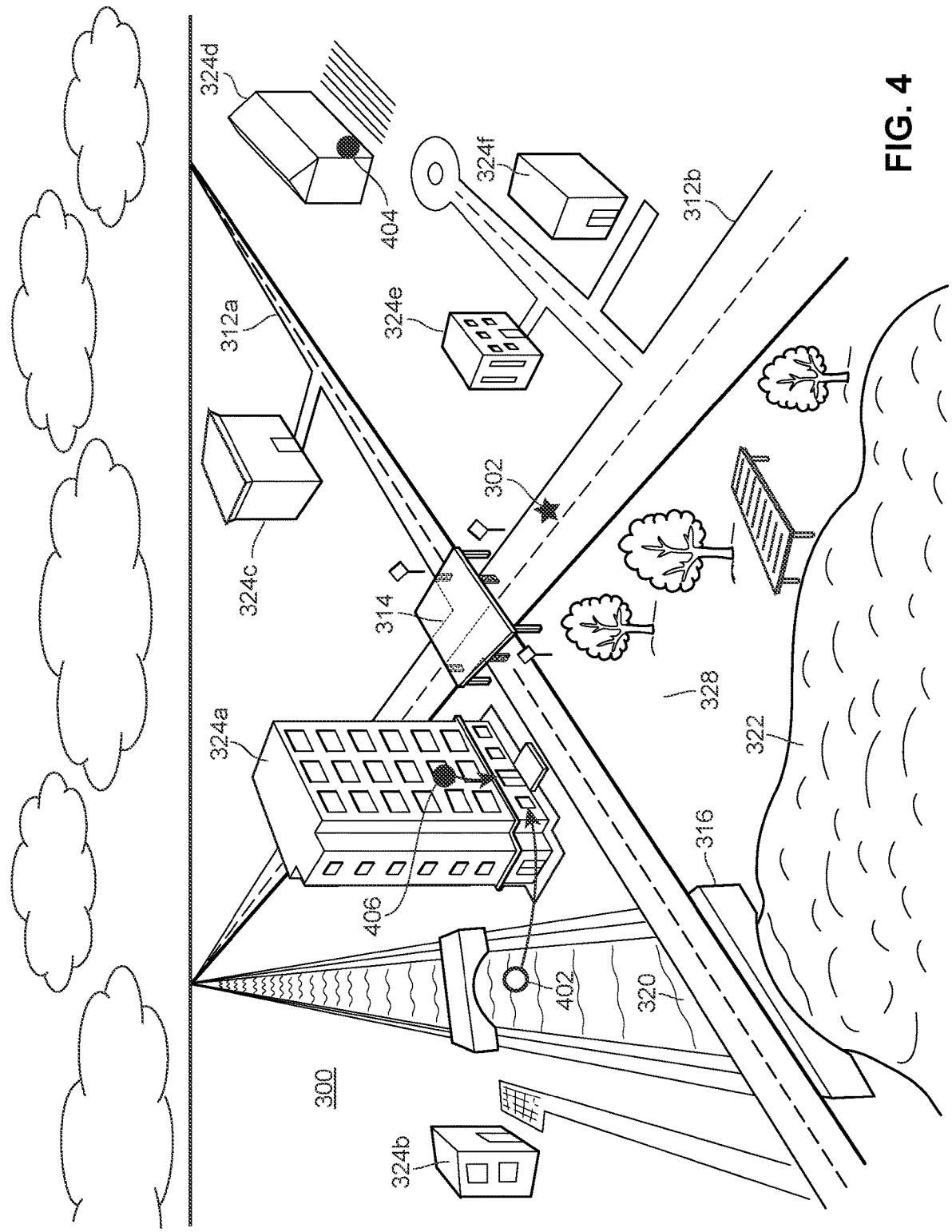
FIG. 4 illustrates the exemplary virtual landscape of FIG. 3, further including visual overlays presented in the virtual environment in accordance with user interaction data.

Engagement of the virtual user tools described herein may cause one or more visual overlays to be presented within the virtual property signifying the provided user interaction data. FIG. 4 depicts the example virtual landscape 300 of FIG. 3, modified via visual overlays that may be displayed in response to received user interaction data. In some embodiments, such visual overlays may indicate that the user has correctly identified one or more aspects of the virtual landscape that affect insurability. Virtual overlays in the virtual landscape 300 include, for example, a first virtual overlay 402 identifying proximity of the river 320 to the virtual property 324*a*. A second virtual overlay 404 may identify a deficient structural material of the virtual property 324*d* (e.g., a structural material that will not hold up to observed weather and/or climate of the virtual landscape 300). A third virtual overlay 406 may indicate, for example, that a restaurant on the first floor of the virtual property 324*a* poses a fire risk to a residential property located on the second floor of the same virtual property 324*a*.

In some embodiments, the user may provide interaction data via additional means external to the virtual environment. For example, during or subsequent to a session in the virtual environment, the user may provide written, oral, and/or electronic responses to identify aspects of the virtual landscape that affect insurability of one or more virtual properties and/or entities.

Generally, a user's performance in the virtual environment may be evaluated based upon the user's success or failure in identifying one or more aspects of a virtual landscape affecting insurability of a virtual property and/or entity associated therewith. The user's performance may be based, for example, on (1) a total number of such aspects identified by the user and/or tasks completed in the virtual landscape, (2) a number of aspects falsely identified by the user as affecting insurability, (3) a user's identification of aspects and/or completion of tasks within a time limit, and/or other suitable criteria. In some embodiments, a user's performance within a particular virtual landscape may be expressed as a composite score (e.g., 0 to 100). Moreover, at a higher level, the user's performance may be determined based on evaluations of higher-level critical determinations by the user as to the insurability of a business or property depicted in the virtual landscape (e.g., eligibility for a particular insurance policy such as homeowners insurance, renters insurance, or commercial insurance). In any case, a composite score and/or other performance metrics may be used to compare performance between two or more users in a same virtual landscape, and/or to compare performance by one or more users in two or more virtual landscapes.

In some embodiments, the server 140 may store user performance data corresponding to one or more users, for subsequent use in generating virtual landscapes and/or providing virtual landscapes to one or more users. For example, if the server 140 determines that user performance data indicates that a particular user (or a group of users) has struggled to assess geographical components of virtual landscapes (e.g., risk posed by rain, flood, etc.), the server 140 may subsequently generate and/or provide one or more virtual landscapes having unique geographical components, so as to provide necessary training experience to those particular one or more users. Conversely, if user performance data indicates that one or more users have successfully assessed geographical components of virtual landscapes, the server 140 may subsequently generate and/or provide one or more virtual landscapes that share common geographical components (e.g., same high-level terrain layout), so as to focus user attention on other aspects of the virtual landscape in which further training is necessary.

In some embodiments, the server 140 may implement one or more of the above-described modifications by applying one or more weighting factors to an algorithm for generating components of virtual landscapes, based upon received user performance data. For example, in response to determining that users have struggled to assess risk or insurance eligibility based upon flood risks, the server 140 may apply a weighting factor to an algorithm to cause lakes, rivers, flood plains, low-lying terrain, and/or other suitable components to be more likely to be included in subsequently generated virtual landscapes, so as to provide targeted training experiences to users where appropriate.

Shared Virtual Environments

In some embodiments, the server 140 may implement a shared virtual environment that enables two or more users to simultaneously navigate a virtual environment including a virtual landscape. To implement a shared virtual environment among two or more users, the server 140 may send data to and/or receive data from two or more virtual environment interface devices 200 via the network 130. While a two-user virtual environment is described herein, it should be understood that via these techniques, any suitable number of users may share a virtual environment simultaneously.

In some embodiments, where two or more virtual environment interface devices 200 have differing computing capabilities (e.g., a comparatively high-capability special-purpose VR system and a comparatively low-capability, general-purpose smartphone), the server 140 may establish and maintain the shared virtual environment session by providing different data to the two or more different virtual environment interface devices 200 in accordance with their computing capabilities. For example, the server 140 may provide, to a first high-capability virtual environment interface device, a high-fidelity virtual environment, and further provide, to a second low-capability virtual environment interface device, a comparatively low-fidelity virtual environment that corresponds to the high-fidelity virtual environment, but comprises less data than the high-fidelity virtual environment. The low-fidelity virtual environment may, for example, include a lower graphical resolution, display fewer components, and/or be provided at a lower frames-per-second count in order to reduce data transmission and computing demand at the low-capability device.

In any case, to implement a shared virtual environment, the server 140 may establish one or more communication channels for substantially real-time bidirectional communication between two users. The one or more communication channels may include a text communication channel, a voice communication channel (e.g., voice-over-Internet-protocol (VOIP) channel), and/or another one or more suitable communication channels. The establishment of the one or more communication channels may enable two users to view representations of one another in the virtual environment based upon transmitted tracking data. Moreover, in some embodiments, the establishment of the one or more communication channels may enable two users to guide one another's movement and/or focus in the shared virtual environment.

In one example implementation of a shared virtual environment, the server 140 may generate a virtual landscape and provide the generated virtual landscape to a first "expert trainer" user and a second "trainee" user (e.g., via respective second virtual environment interface devices 200). Through the establishment of the shared virtual environment between the trainer and trainee users, the trainer user may observe the trainee user's navigation throughout the virtual landscape to identify aspects of the virtual landscape affecting insurability of one or more virtual properties and/or entities. In some embodiments, either or both users may be represented in the virtual environment via respective virtual avatars whose movement about the virtual environment may be controlled via input from the respective user.

In some embodiments, further virtual tools may be implemented in the shared virtual environment, via use of which the expert trainer user may improve the training experience of the trainee user. Such expert trainer tools may include, for example, a view control tool that enables the expert trainer user to control the movement and/or visual focus of the trainee user within the virtual environment. Furthermore, in a shared virtual environment, any use of suitable virtual tools by either user may be made visible to the other user in the shared environment. For example, if the expert trainer user uses an annotation tool to mark a particular component of the virtual landscape (e.g., as shown in FIG. 4), the marking via the annotation tool may be viewable by the trainee user in a substantially real-time manner in the shared virtual environment. Thus, via use of communication channels and/or virtual tools in the shared virtual environment, two or more users may collaborate to direct each other's attention to particular components of a virtual landscape to successfully identify aspects affecting insurability of virtual properties and/or entities.

Landscape Aspect Configuration Studio

Figure 5:
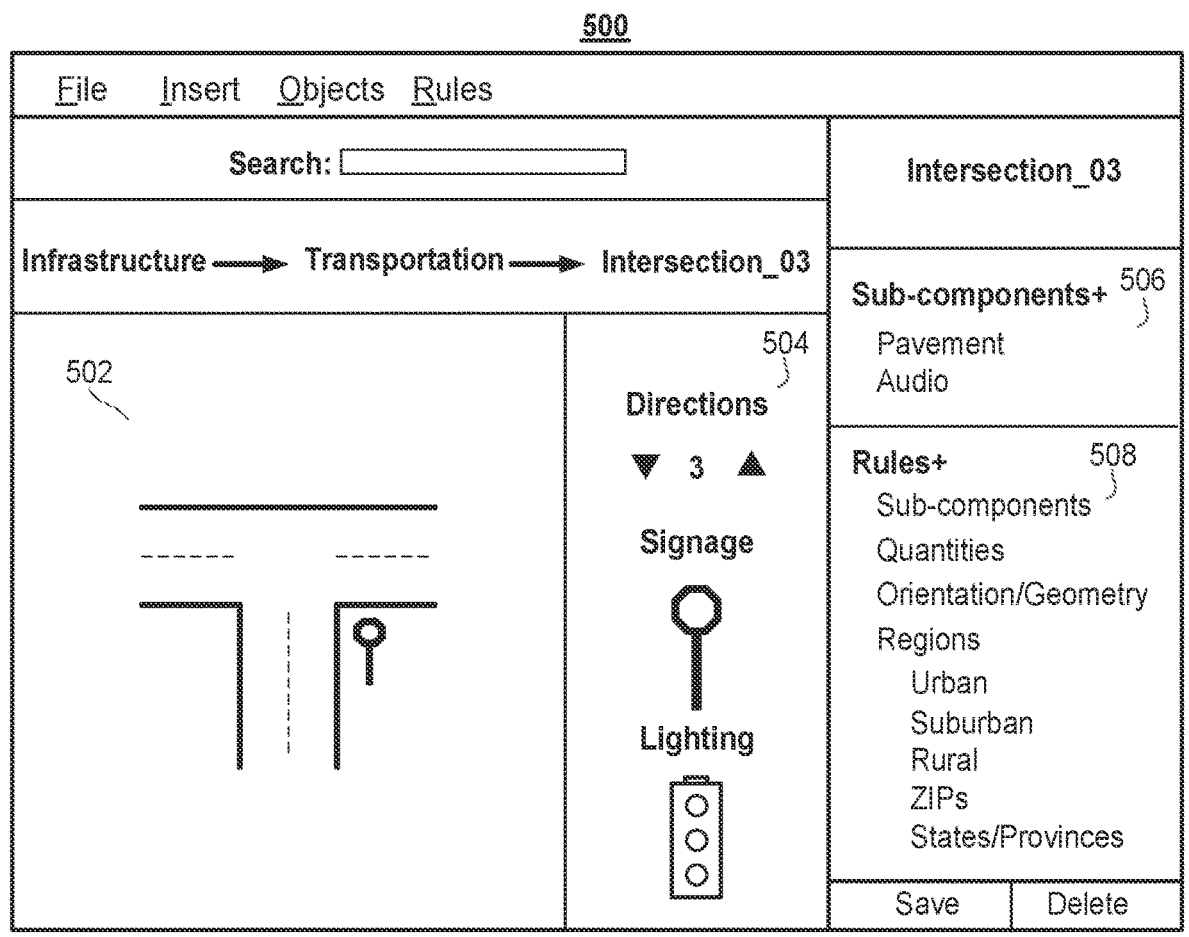
FIG. 5 illustrates an exemplary interactive graphical user interface (GUI) via which a user may define components of virtual landscapes and/or procedural rules for use in generating virtual landscapes.

In some embodiments, a computing device (e.g., server 140) may store one or more applications that enable a user to create, view, and/or modify digital assets to be used to procedurally generate one or more virtual landscapes. FIG. 5 illustrates an example interactive graphical user interface (GUI) 500 that may enable the user to create, view, and/or modify digital assets and/or rules for use in generating virtual landscapes. The user may access the GUI 500 via the server 140 and one or more suitable input devices (e.g., mouse, keyboard, voice input, etc.), and/or via other suitable computing devices including those described herein.

The example GUI 500 may include a first component display panel 502 via which the user may view one or more graphical objects corresponding to a component to be provided in virtual landscapes. For example, as depicted in FIG. 5, the panel 502 may display a traffic intersection ("Intersection_03") that a user may create for use various virtual landscapes that include roads. Associated with the panel 502 may be a second sub-component display panel 504, which may enable the user to display and/or modify various sub-components and/or characteristics of the component displayed in the panel 502. In the case of the intersection depicted in panel 502, the panel 504 may provide for display and/or modification of the number of directions in the intersection (e.g., three or four-way intersection), signage to be posted at the intersection, and/or traffic lights to be included at the intersection.

The GUI 500 further includes a sub-components selection panel 506 via which the user may further define sub-components and/or characteristics of the intersection depicted in the panel 502. The user may define, for example, a type of pavement material, or an audio file associated with the intersection (e.g., to be played when a vehicle passes the intersection).

The GUI 500 includes a rules panel 508 via which the user may create, modify, and/or delete rules corresponding to generation of components of virtual landscapes. As depicted in the example GUI 500, these rules may define (1) sub-components of the component, (2) a minimum, maximum, and/or preferred quantity of the component, (3) a required special orientation of the component (e.g., flat along terrain, not overlapping another structure, etc.), (4) particular regions in which the component may appear (e.g., urban, suburban, and/or rural regions, or regions representative of particular state, provinces, or ZIP codes), and/or (5) circumstances under which the component affects insurability of a virtual property and/or entity.

Effectively, via the example GUI 500, the user may at least partially define a possibility space according to which procedural generation techniques may generate a virtual landscape. Accordingly, in some embodiments, procedurally generating a virtual landscape may include procedurally generating one or more particular assets based upon user-created digital assets and/or user-defined rules. Via various configurations of components of virtual landscapes according to pre-defined rules, uniqueness among two or more virtual landscapes may be ensured, thereby providing emergent insurance prospecting training scenarios for users.

Exemplary Computer-Implemented Methods

Figure 6:
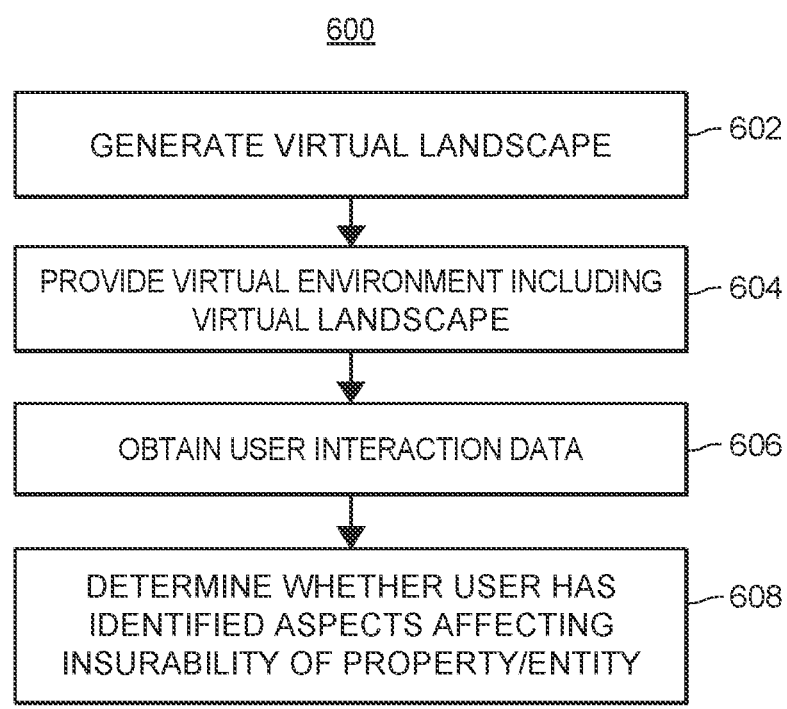
FIG. 6 illustrates a flow chart of an exemplary computer-implemented method for generating and providing a virtual landscape, in accordance with some embodiments.

FIG. 6 illustrates an exemplary computer-implemented method 600 for generating and providing a virtual environment comprising a procedurally generated virtual landscape. The method 600 may be implemented, for example, via computing elements of the virtual environment system 100 depicted in FIGS. 1-2 (e.g., via one or more processors executing non-transitory computer-executable instructions stored via one or more non-transitory computer-readable memories). In some embodiments, one or more computer-readable media may store non-transitory computer-executable instructions that, when executed via one or more processors, cause one or more computing devices to perform actions of the method 600. The method 600 may include additional, fewer, and/or alternate actions to those described herein, in some embodiments.

The method 600 includes generating a virtual environment comprising a virtual landscape including one or more virtual properties (602). The virtual landscape may generally represent a theoretical geographical area such as a town, one or more city blocks, a shopping mall, a strip mall, or another appropriate physical environment upon which real properties may be found. The generated virtual landscape includes a plurality of components, inclusive of the one or more properties as well as natural elements, infrastructural components, other man-made structures, and/or other components of virtual landscapes described herein. Generating the virtual landscape may include automatically generating (e.g., algorithmically generating) at least a portion of a plurality of components in accordance with a predefined rule set (e.g., procedural generation rules). Generating the virtual landscape may include, for example, generating the virtual landscape based upon one or more predefined parameters and/or a random "map seed." Generating at least a portion of the plurality of components may include, for example (1) selecting one or more components to include in the virtual landscape (2) defining sub-components of the one or more components, and/or (3) defining one or more characteristics (e.g., placement, size, rotation, condition, etc.) of those one or more components. Generating the virtual landscape may comprise implementation of any of the procedural generation techniques described herein.

The virtual landscape, once generated, may be associated with one or more aspects thereof that affect insurability of (e.g., risk associated with, or eligibility of) one or more virtual properties therein, and/or of one or more entities associated with the one or more virtual properties. In some embodiments, aspects affecting insurability may be manually defined by a human user such as an insurance prospecting specialist. In some embodiments, generating the virtual landscape may include automatically identifying one or more aspects affecting insurability based upon the pre-defined rule set.

The method 600 includes providing, to a virtual environment interface device (e.g., one or more virtual environment interface devices 200), the virtual environment comprising the generated virtual landscape (604). One or more computing devices (e.g., the server 140 of FIG. 1) may provide a virtual environment session by transmitting data to and/or receiving data from one or more virtual environment interface devices (e.g., devices 200) corresponding to one or more respective users.

Providing the virtual environment may include providing various virtual tools via which user interaction data may be obtained, the user interaction data being indicative of user interaction with the virtual environment (e.g., user actions within the generated virtual landscape). Accordingly, the method 600 may include obtaining user interaction data indicative of activity of the user in the virtual landscape (606). The obtained user interaction data may include, for example, (1) data indicative of user annotation (e.g., highlighting, circling, etc.) of one or more components of the virtual landscape, and/or (2) tracking data corresponding to the user (e.g., field of view tracking or visual focus tracking).

The method 600 further includes determining, based upon the obtained user interaction data, whether the user has identified at least one of the one or more aspects of the virtual landscape that affect insurability of the one or more virtual properties and/or entities. Determining whether the user has identified an aspect affecting insurability may include (1) determining whether the user interaction data indicates that the user has attempted to identify an aspect (e.g., has actively marked one, two, or more components, has focused on a particular component beyond a predetermined threshold, etc.), and (2) determining whether the attempt indeed corresponds to an aspect affecting insurability. In some embodiments, the method 600 may further include providing a visual overlay within the virtual environment to indicate whether the user has correctly or incorrectly identified an aspect affecting insurability. In some embodiments, the method 600 may include scoring the user (e.g., 0 to 100) based upon overall performance within the provided virtual landscape.

The method 600 further includes generating a second virtual landscape, adjusting the virtual environment (e.g., providing a "second environment) to include the second virtual landscape, and providing the second virtual landscape to the user. The second virtual landscape may include a second plurality of components, at least a portion of which may be automatically generated based upon the predefined rule set. Via the procedural generation techniques herein, at least a portion of the components of the second generated virtual landscape may coincide with those of the first virtual landscape, and at least a portion of the components may differ. The second virtual landscape may be associated with another one or more aspects affecting insurability of one or more virtual properties and/or entities in the second virtual landscape. As with the first virtual landscape, user interaction data relating to user activity in the second virtual landscape may be obtained, and the method 600 may include determining whether the user has identified one or more aspects of the second virtual landscape affecting insurability of one or more properties and/or entities therein.

In some embodiments, the method 600 may include comparing user interaction data from the first and second virtual landscapes (and/or other virtual landscapes) to identify trends relating to the user's performance in identifying aspects affecting insurability in multiple virtual landscapes. Based upon the user's performance in multiple virtual landscapes, strengths and weaknesses of the user may be identified, and subsequent virtual landscapes may be generated and/or provided to the user based upon the user's previous performance. Furthermore, in some embodiments, the method 600 may include determining user performance across multiple users of one or more virtual landscapes, and the method 600 may include generating and/or providing virtual landscapes (e.g., by adjusting the virtual environment) based upon the performances of multiple users in the one or more virtual landscapes. To this end, one or more scores associated with user performance may be generated for user training and evaluation.

Additional Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographical location (e.g., within a home environment, an office environment, or a server farm). In other example embodiments, the one or more processors or processor-implemented modules may be distributed across a number of geographical locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112(f), unless traditional means-plus-function language is expressly recited, such as "means for" or "step for" language being explicitly recited in the claims. The systems and methods described herein are directed to an improvement to computer functionality, and improve the functioning of conventional computers.

What is claimed:

1. A system, comprising:
   a processor; and
   memory storing computer-executable instructions that, when executed by the processor, cause the processor to perform operations comprising:
      generating a first virtual landscape comprising a first component representing one of a natural element or a man-made element, wherein the first virtual landscape includes a first aspect affecting risk to a first property represented in the first virtual landscape;
      generating, based at least in part on a first user interaction received from a first user within the first virtual landscape, performance data for the first user, the performance data based at least in part on at least one of a number of correctly identified aspects identified in the first virtual landscape or a number of falsely identified aspects identified in the first virtual landscape; and
      generating, based at least in part on the performance data and a second user interaction received from a second user within the first virtual landscape, a second virtual landscape, the second virtual landscape comprising a second component that differs from the first component, wherein the second virtual landscape includes a second aspect affecting risk to a second property represented in the second virtual landscape.

2. The system of claim 1, wherein the operations further comprise generating a visual overlay in the second virtual landscape based on at least one of the first user interaction or the second user interaction.

3. The system of claim 2, wherein the visual overlay comprises an indication of a score based at least in part on the performance data.

4. The system of claim 1, wherein generating the second virtual landscape comprises determining the second component based on at least one of the performance data, the first user interaction, a weighting factor associated with the second component, or the second user interaction.

5. The system of claim 1, wherein generating the second virtual landscape is further based at least in part on past performance data for the first user associated with one or more past virtual landscape.

6. The system of claim 1, wherein the first user interaction comprises an indication of the first component being associated with one or more of a hazardous material, a third aspect affecting insurability, or a fourth aspect unrelated to insurability.

7. The system of claim 1, wherein the first user interaction comprises an indication that a relative arrangement, within the first virtual landscape, of the first component and a third component of the first virtual landscape is associated with a third aspect affecting insurability.

8. A computer-implemented method comprising:
   generating, by a processor, a first virtual landscape comprising a first component representing one of a natural element or a man-made element, wherein the first virtual landscape includes a first aspect affecting risk to a first property represented in the first virtual landscape;
   generating, by the processor and based at least in part on a first user interaction received from a first user within the first virtual landscape, performance data for the first user, the performance data based on at least one of a number of correctly identified aspects identified in the first virtual landscape or a number of falsely identified aspects identified in the first virtual landscape; and
   generating, based at least in part on the performance data and a second user interaction received from a second user within the first virtual landscape, a second virtual landscape, the second virtual landscape comprising a second component that differs from the first component, wherein the second virtual landscape includes a second aspect affecting risk to a second property represented in the second virtual landscape.

9. The computer-implemented method of claim 8, wherein the first user interaction comprises an indication of the first component being associated with one or more of a hazardous material, a third aspect affecting insurability, or a fourth aspect unrelated to insurability.

10. The computer-implemented method of claim 8, wherein generating the second virtual landscape comprises generating, in the second virtual landscape, at least one of a first avatar representing the first user or a second avatar representing the second user.

11. The computer-implemented method of claim 8, wherein the first user interaction comprises an indication that a relative arrangement, within the first virtual landscape, of the first component and a third component of the first virtual landscape are associated with a third aspect affecting insurability.

12. The computer-implemented method of claim 8, wherein the first user interaction comprises a modification of a characteristic of the first component.

13. The computer-implemented method of claim 8, wherein:
   the second user interaction comprises a modification of the first component; and
   generating the second virtual landscape comprises determining the second component based at least in part on the modification of the first component.

14. The computer-implemented method of claim 8, wherein generating the second virtual landscape is further based at least in part on a user performance trend determined based at least in part on past performance data for the first user associated with one or more past virtual landscape and the performance data.

15. A non-transitory computer-readable medium comprising instructions that, when executed by one or more processors, cause the one or more processors to perform operations comprising:
   generating a first virtual landscape comprising a first component representing one of a natural element or a man-made element, wherein the first virtual landscape includes a first aspect affecting risk to a first property represented in the first virtual landscape;
   generating, based at least in part on a first user interaction received from a first user within the first virtual landscape, performance data for the first user, the performance data based on at least one of a number of correctly identified aspects identified in the first virtual landscape or a number of falsely identified aspects identified in the first virtual landscape; and
   generating, based at least in part on the performance data and a second user interaction received from a second user within the first virtual landscape, a second virtual landscape, the second virtual landscape comprising a second component that differs from the first component, wherein the second virtual landscape includes a second aspect affecting risk to a second property represented in the second virtual landscape.

16. The non-transitory computer-readable medium of claim 15, wherein the first virtual landscape is representative of a geographical area comprising a unitary area of land.

17. The non-transitory computer-readable medium of claim 15, wherein generating the second virtual landscape comprises determining the second component based on at least one of the performance data, the first user interaction, the second user interaction, or a predefined rule that the second component differs from the first component.

18. The non-transitory computer-readable medium of claim 15, wherein generating the second virtual landscape comprises determining the second component based at least in part on one or more rules defining:
   a geometrical intersection of the second component and one or more additional components,
   a terrain layout associated with the second component,
   an infrastructure arrangement associated with the second component,
   a quantity of components associated with the second component, or
   a landscape type associated with the second component.

19. The non-transitory computer-readable medium of claim 15, wherein the first user interaction comprises an indication of the first component being associated with one or more of a hazardous material, a third aspect affecting insurability, or a fourth aspect unrelated to insurability.

* * * * *